Figure 1:
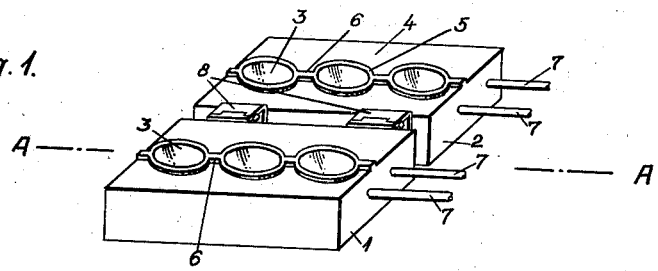

Aug. 19, 1941.    R. FRAKNOI    2,253,291
PROCESS FOR THE MANUFACTURE OF HOLLOW ROTATING BODIES
Filed Nov. 11, 1937

Rudolph Fraknoi
Inventor
By Focko Blum
Attorneys

Patented Aug. 19, 1941

2,253,291

UNITED STATES PATENT OFFICE 2,253,291

PROCESS FOR THE MANUFACTURE OF HOLLOW ROTATING BODIES

Rudolph Fraknoi, Matyasfold, Hungary, assignor to Magyar Ruggyantaarugyar Reszvenytarsasag, Budapest, Hungary Application November 11, 1937, Serial No. 173,998
In Hungary November 21, 1936

9 Claims. (Cl. 18—56)

In application Serial No. 109,381, filed November 5, 1936, a process and an apparatus for the manufacture of moulded hollow rubber bodies is described in which the pre-stamping, inflating, stamp-welding and vulcanizing of the figures is performed in one continuous working process, in situ, within one and the same mould. In carrying out this process for the manufacture of balls, it has been ascertained that perfect balls can be produced only by additional further process features and by suitably directing the entire process.

According to the above mentioned application, the inflation of the moulded body has followed the pre-stamping thereof and thereby the amount of material necessary for the formation of the moulded body has been limited to the rubber sheets required for the manufacture prior to inflation, that is, to the shaping. When inflated, the rubber confined in this manner by fitting into the cavities becomes at places thinner corresponding to the shape of the cavities, so that generally the product shows an unequal wall-thickness at certain places. For example, in the case of balls, the thin places occur at the bottom of the mould cavities owing to the fact that the rubber sheet is subjected at these points to the greatest stretching. However balls with unequal wall thicknesses do not bounce with the required regularity owing to this defect.

In order to produce proper balls and similar rotating bodies, it was therefore necessary to overcome and eliminate the aforementioned defects. Experiments have shown that rubber sheets of practically uniform thickness can be pressed into the cavities of moulds by means of cooperating tools which are provided with projections corresponding to the shape of the cavities, said projections being smaller than the cavities by the wall-thickness of the moulded body to be produced, whereby the pressing is effected by means of cold tools and cold rubber sheets without stamping out the latter. In this case the rubber sheet moves freely at the edges of the cavities so that the stretching required for shaping is distributed on the entire surface of the cold elastic rubber sheet subjected to the shaping operation. The stamp-welding of the moulded body takes place only after the pressing, by superposing and compressing the mould halves filled with the two rubber sheets.

From the point of view of the uniformity of the seams produced by pressing, the formation of the borders of the cavities is of importance. If cutting edges are provided around the cavities, then after the necessary removal of the protrusions appearing on the vulcanized article at the place of the seams, the walls of the balls are thinner there than at other places and the seams easily rupture. In order to avoid this drawback, the cavities are provided, in accordance with the invention, with ribs which have no cutting edges. Those parts of the rubber sheets which contact such ribs are shifted during the compression partly into the inside of the cavities and partly outside the outer edges of the ribs, so that the welding line on the vulcanized moulded body has practically the same wall thickness as the other parts of the balls after the welding ridges are removed.

Accordingly this invention relates to an improvement in the process application Serial No. 109,381, for the manufacture of hollow rotating bodies, in which the rubber sheets used for the manufacture of moulded bodies are pressed prior to their stamp-welding into the cavities of a cold two-pieced mould by means of a cooperating tool, the size of the latter being smaller by the thickness of the wall of the body to be produced; thereupon the stamp-welding is carried out by means of ribs directly surrounding the cavities, said ribs having non-cutting edges.

In order to more clearly demonstrate the invention, one method of carrying out the process of the invention is described hereafter with reference to the enclosed drawing.

Figure 2:
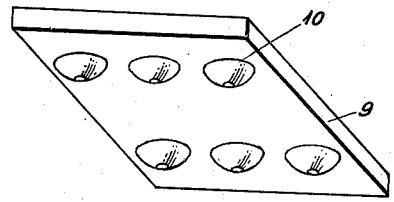
Figure 3:
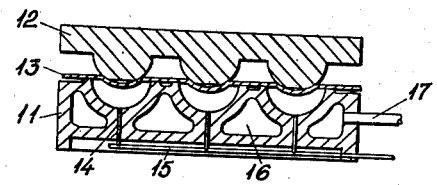
Figure 4:
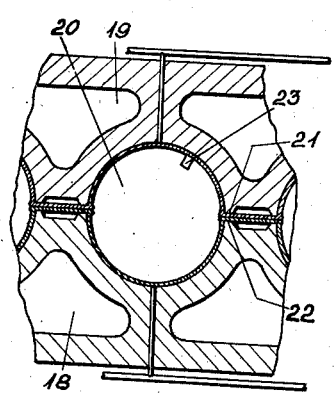
Figure 5:
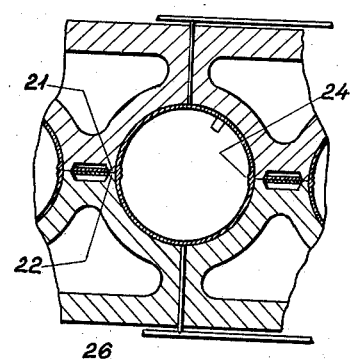
Figure 6:
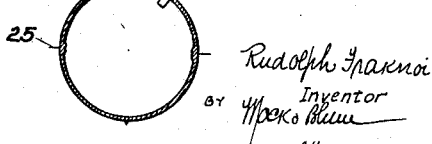

Fig. 1 is a perspective view on a reduced scale of a two-pieced mould for producing balls according to the invention. Fig. 2 is also a perspective view on a reduced scale of the cooperating tool used for pressing. Fig. 3 shows the mould, the cooperating tool and the interposed rubber sheets during the pressing operation, along the lines A—A of Fig. 1. Fig. 4 represents a section of the closed mould consisting of two superposed mould halves with inserted rubber sheets before the pressing, on a somewhat larger scale. Fig. 5 is a view similar to Fig. 4 after pressing, i. e. after the stamp-welding of the rubber sheets. Fig. 6 is the cross-section of the ball taken off from the mould after vulcanisation.

In accordance with Fig. 1, the lower and upper mould halves 1 and 2, which may be cooled and heated, are provided with hemispherical cavities 3. The cavities are provided with flat ribs 5 protruding from and extending above the plane 4 of the mould. These flat ribs 5 are connected to each other by walls, the top part 6 of which, also protrudes from the plane of the mould and lies in the plane of the top of the ribs. The moulds are hollow around the cavities 3 and may be heated or cooled through the conduits 7. The two mould sections 1 and 2 can be closed by means of hinges or joints 8.

According to Fig. 2, the cooperating tool used for pressing consists of the metal plate 9 and of the metallic hemispherical projections 10, the shape of which corresponds to that of the cavities 3 of the mould, its radius however is smaller by the thickness of the wall of the ball to be produced. The hemispheres 10 may be associated with metal plate 9 in any desired manner and may form an integral body therewith.

Fig. 3 shows the rubber sheet 13 introduced between the mould 11 and pressing tool 12. In the cavities of the mould, a vacuum may be produced through the small channels 14 and the connecting channel 15. The hollow sections 16 and the conduits 17 enable the introduction of the heating or cooling agent.

Fig. 4 shows the raw rubber ball 20 within the mould consisting of upper and lower halves 18 and 19. The sheets forming the ball lie one above the other between the ribs 21 and 22 without being welded. The ball is provided at its inner wall with stopper 23.

In accordance with Fig. 5, the ribs 21 and 22 are already closed whereby the two rubber sheets forming the ball are welded along the seam 24.

In Fig. 6 there can be observed the welding ridges 25 on the ball taken off from the mould and also the small protrusion 26 produced by the vacuum.

The balls according to the invention are produced by means of the apparatus illustrated in the drawings in the following manner.

The mould as shown in Fig. 1 is placed on a pressing plate and covered with a raw rubber sheet. Subsequently the cooperating tool of Fig. 2 is superposed and the cold rubber sheet is pressed into the cavities of the mould in the manner illustrated in Fig. 3. After this pressing a substantial vacuum is produced between the wall of the cavities and the pressed in rubber sheet to prevent detaching of the rubber sheet from the wall, through the withdrawal of the cooperating tool. Subsequent to the removal of this tool, the rubber sheets lying within the cavities, are provided with the raw rubber stoppers 23, so that every completed ball should contain such stopper. Thereupon the inflating agent necessary during vulcanisation is introduced. The mould parts filled in this manner are then closed and subjected to a welding pressure under heating. The superfluous rubber parts which are cut through by the ribs of the cavities and also by the walls 6 are pulled out at the two sides of the mould. Thereupon the moulds are heated to vulcanisation temperature and after vulcanisation cooled to a temperature suitable for opening. After cooling and opening, the vulcanised balls are removed from the cavities of the mould. As may be seen from Fig. 6, the vulcanised balls show at the welding line, thin rubber ridges and at the places of the vacuum channels, small protrusions which may be removed by scraping off. Finally the balls are subjected to finishing operations such as painting, inflating to a certain hardness, etc.

Instead of moulds as described, having only one row of cavities, moulds with several rows may be employed. In this case it is necessary to provide suitable cutting walls between the cavities in order to be able to remove the superfluous raw rubber parts of the sheets. The cavities must be spaced in such manner that this operation should not cause any difficulty.

The mould and the cooperating tool may be moulded into automatic presses. Generally, it is advisable to fasten the lower and upper parts of the mould, each separately, to one pressing plate of the press and to divide such pressing plates into two jointed parts.

It is also possible to use cooperating tools acting simultaneously at two sides, which tools might be introduced between two mould halves arranged one above the other.

Having now particularly described and ascertained the nature of my said invention and in what manner the same is to be performed, I declare that what I claim is:

1. A process for the manufacture of hollow rubber articles from unvulcanized rubber sheets which comprises covering a cooled mould having cavities provided with peripheral flat top ribs extending above the plane of said mould, with a raw rubber sheet, drawing parts of said sheet into said cavities by means of a cold cooperating tool, causing said parts of said sheet drawn into said cavities to adhere by suction to the wall of said cavities, removing said cooperating tool, introducing an inflating agent into said cavities, superposing another mould provided with a similar sheet upon said mould, pressing said moulds to each other while imparting a welding temperature to said moulds, thereby stamp-welding the parts of the article within the cavities of the moulds and cutting the remaining part of the sheets in strips, pulling out said strips from said moulds, heating the walls of said cavities to a vulcanizing temperature and vulcanizing said articles.

2. A process for the manufacture of hollow rubber articles from vulcanized rubber sheets, which comprises covering a cold mould having cavities provided with peripheral flat top ribs extending above the plane of said mould with a raw rubber sheet, drawing parts of said sheet into said cavities by means of a cold cooperating tool, causing said parts of said sheet drawn into said cavities to adhere by suction to the wall of said cavities, removing said cooperating tool, introducing an inflating agent into said cavities, super-posing another mould provided with a similarly formed sheet upon said mould, pressing said moulds to each other while imparting a welding temperature to said moulds, thereby stamp-welding the parts of the article within the cavities of the moulds and cutting the remaining part of the sheet into strips, pulling out said strips from said moulds, heating the walls of said cavities to vulcanizing temperature, vulcanizing said articles and cooling said moulds to a temperature suitable for opening same.

3. A process for the manufacture of hollow rubber articles from unvulcanized rubber sheets which comprises covering a cold mould having cavities provided with peripheral flat top ribs extending above the plane of said mould, with a raw rubber sheet, drawing said sheet into said cavities, said sheet being freely compensating to different tensions over its surface while drawing, causing said parts of said sheet drawn into said cavities to adhere by suction to the wall of said cavities, removing said cooperating tool, introducing an inflating agent into said cavities, super-posing another mould provided with a similar sheet upon said mould, pressing said moulds to each other upon said mould while imparting a welding temperature to said moulds, thereby stamp-welding the parts of the article within the cavities of the moulds and cutting the remaining part of the sheets in strips, pulling out said strips from said moulds, heating the walls of said cavities to a vulcanizing temperature, and vulcanizing said articles.

4. A process for the manufacture of hollow rubber articles comprising the steps following one another in quick series; drawing of parts of the article to be manufactured from a cool sheet throughout, freely compensating different tensions consisting of raw rubber into cavities, super-posing such shaped sheets upon each other, heating to a welding temperature, stamp-welding the parts of the article to each other, heating the article to a vulcanizing temperature, vulcanizing and cooling the same.

5. A process for the manufacture of hollow rubber articles from raw rubber sheets which comprises covering a hollow cool mould having cavities provided with peripheral flat top ribs extending above the plane of said mould, with a cold raw rubber sheet, drawing said sheet partially into said cavities, causing said parts drawn into said cavities to adhere by suction to the wall of said cavities, providing said parts with a raw rubber stopper, introducing an inflating agent into said cavities, super-posing another mould carrying parts of the article to be manufactured, pressing said moulds to each other while imparting a welding temperature to said moulds by introducing heating means into hollow spaces, provided within said moulds, thereby stamp-welding the parts of said article within said cavities and cutting the remaining part of said sheet into strips, pulling out said strips from said moulds, heating the walls of said cavities to vulcanizing temperature by introducing heating means into said hollows, vulcanizing, and cooling said moulds by introducing cooling means into said hollows provided in said mould or moulds, so as to impart a temperature suitable for opening said moulds.

6. A process for the manufacture of hollow rubber articles from unvulcanized rubber sheets which comprises drawing parts of said sheet into the cavities of a cold two-sectioned mould by means of a cold cooperating tool, said cavities being provided with peripheral flat top ribs extending above the plane of said mould, said parts being retained within said cavities by suction after said cooperating tool is removed, super-posing said two mould sections upon each other, stamp-welding the parts of the pre-formed sheet to each other by applying pressure to the heated rims of said parts, introducing heating means of vulcanizing heat into said mould sections, vulcanizing the article within said moulds and cooling.

7. A process according to claim 6, characterized by the method to draw parts of the sheet adapted to slide freely over the edges of peripheral flat ribs surrounding the cavities and extending above the plane of said mould, said ribs being adapted to press rubber material towards the seam connecting the two parts of the article to be manufactured, so as to get an enforcement of the same when stamp-welding the two parts of the article to be manufactured.

8. A process according to claim 5 characterized by the fact that the heat necessary for vulcanization is introduced into hollows formed in said moulds, said hollow sections surrounding the mould cavities.

9. The process of making hollow rubber articles from un-vulcanized rubber sheets consisting of shaping the article to be manufactured in two parts in cold cavities by means of cold cooperating tools, the edges of the mould cavities having peripheral flat top ribs extending above the plane of said mould to support said sheet, said ribs having protrusions of the same height, adapted to cut the sheets into strips when stamp-welding the two parts of the article to be manufactured by closing the mould sections under heating, removing the surplus rubber stock, introducing vulcanizing heating means into said moulds to heat immediately the walls of said cavities, vulcanizing and cooling the article to be manufactured.

RUDOLPH FRAKNOI.